(12) United States Patent
Kopel et al.

(10) Patent No.: US 9,181,958 B1
(45) Date of Patent: *Nov. 10, 2015

(54) FAN SHROUD FOR PUMP (71) Applicant: Hydro-Gear Limited Partnership, Sullivan, IL (US)

(72) Inventors: Thomas Kopel, Sullivan, IL (US); Thomas A. Roth, Lerna, IL (US); Thomas P. Gavin, Sullivan, IL (US); B. Keith Harshman, Sullivan, IL (US); Bryce E. Steenburg, Mattoon, IL (US); Raymond Hauser, Sullivan, IL (US); Lonnie E. Holder, Reston, VA (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,267

(22) Filed: Aug. 29, 2014

Related U.S. Application Data (63) Continuation of application No. 13/946,739, filed on Jul. 19, 2013, now Pat. No. 8,858,198, which is a continuation of application No. 11/088,560, filed on Mar. 24, 2005, now abandoned.

(60) Provisional application No. 60/558,538, filed on Apr. 1, 2004.

(51) Int. Cl.
*H02K 9/04* (2006.01)
*H02K 9/06* (2006.01)
*H02K 9/14* (2006.01)
*F04D 29/40* (2006.01)
*F04D 19/00* (2006.01)
*B60K 11/06* (2006.01)
*F04D 25/08* (2006.01)

(52) U.S. Cl.
CPC .............. *F04D 29/403* (2013.01); *B60K 11/06* (2013.01); *F04D 19/002* (2013.01); *H02K 9/06* (2013.01); *H02K 9/14* (2013.01); *F04D 25/082* (2013.01); *H02K 9/04* (2013.01)

(58) Field of Classification Search
CPC ............. H02K 9/04; H02K 9/06; H02K 9/10; H02K 9/12; H02K 9/14; F04B 23/04; F04B 39/06; F04B 39/066; F04D 29/4226; F04D 29/646
USPC ........... 417/269, 271, 313, 372, 423.1, 423.8, 417/423.9, 423.14, 423.15; 248/220.22, 248/300, 310, 309.1, 500, 674, 680
See application file for complete search history.

(56) References Cited

U.S. PATENT DOCUMENTS

| | | |
|---|---|---|
| 1,636,358 A | 7/1927 | Fairman et al. |
| 1,877,285 A | 9/1932 | Eckels |
| 2,594,688 A | 4/1952 | Shapiro |
| 3,362,161 A | 1/1968 | Flint |

(Continued)

FOREIGN PATENT DOCUMENTS

WO 0138743 A1 5/2001

*Primary Examiner* — Peter J Bertheaud
(74) *Attorney, Agent, or Firm* — Neal, Gerber & Eisenberg LLP (57) ABSTRACT

A hydrostatic apparatus is disclosed. The hydrostatic apparatus comprises a pump, an input shaft, a fan and a fan shroud. The pump comprises a housing, an end cap, a first end and a second end. The input shaft extending from the first end and the second end of the pump. The fan is attached to one end of the input shaft. The fan shroud is also attached to the pump.

14 Claims, 8 Drawing Sheets

(56) References Cited

U.S. PATENT DOCUMENTS

| | | | |
|---|---|---|---|
| 3,458,114 | A | 7/1969 | Robert |
| 3,727,712 | A | 4/1973 | Colloton |
| 4,116,279 | A | 9/1978 | Kilburn |
| 4,186,317 | A | 1/1980 | Sisk |
| 4,329,064 | A | 5/1982 | Mann et al. |
| 4,377,203 | A | 3/1983 | Ejima |
| 4,707,971 | A | 11/1987 | Forpahl et al. |
| 4,724,747 | A | 2/1988 | Sturm et al. |
| 5,019,735 | A | 5/1991 | Lee |
| 5,121,788 | A | 6/1992 | Carollo |
| 5,327,036 | A | 7/1994 | Carey |
| 5,343,101 | A | 8/1994 | Matani |
| 5,498,130 | A | 3/1996 | Wakley et al. |
| 5,584,675 | A | 12/1996 | Steurer et al. |
| 6,056,521 | A | 5/2000 | Leu et al. |
| 6,146,113 | A | 11/2000 | Fassnacht et al. |
| 6,331,101 | B2 | 12/2001 | Leu et al. |
| 6,332,393 | B1 | 12/2001 | Trimble |
| 6,435,889 | B1 | 8/2002 | Vinson et al. |
| 6,579,072 | B2 | 6/2003 | Trousil et al. |
| 6,589,029 | B1 | 7/2003 | Heller |
| 6,692,240 | B1 | 2/2004 | Leonhard et al. |
| 8,854,198 | B2 | 10/2014 | Tengler et al. |
| 8,858,198 | B1 * | 10/2014 | Kopel et al. ............... 417/423.15 |
| 2003/0033803 | A1 | 2/2003 | Ohashi et al. |

* cited by examiner

FAN SHROUD FOR PUMP

CROSS-REFERENCE

This application is a continuation of U.S. patent application Ser. No. 13/946,739 filed on Jul. 19, 2013, which is a continuation of U.S. patent application Ser. No. 11/088,560 filed on Mar. 24, 2005, now abandoned, which claims the benefit of U.S. Provisional Application Ser. No. 60/558,538 filed on Apr. 1, 2004. The contents of each of these prior applications is incorporated by reference in its entirety.

FIELD OF THE INVENTION

The present invention relates generally to hydraulic pumps, and more specifically, to hydraulic pumps incorporating a fan or other similar cooling device.

BACKGROUND OF THE INVENTION

Fans mounted on hydraulic pumps are increasingly seen as a relatively low-cost way of providing cooling for such pumps. While these pumps are typically located in a protected location that would minimize contact between the fan blades and an object, providing such protection or the lack of such protection on a vehicle may limit the ability to use a fan mounted to a pump in some applications. Thus, there is a need for a fan shroud that can readily and inexpensively be attached to a stand alone hydraulic pump.

SUMMARY OF THE INVENTION

A fan shroud capable of being mounted to a stand alone hydraulic pump is disclosed herein. Embodiments are described wherein the shroud may be mounted to a bracket that is attached to the pump, or the shroud may be directly attached to a pump element such as an end cap or housing. The details of this invention are set forth below in connection with the detailed description of the embodiments.

DETAILED DESCRIPTION OF THE PRESENTLY-PREFERRED EMBODIMENTS

The present invention is discussed herein in relation to a hydraulic pump and, in particular, a bantam duty variable displacement pump. Nevertheless, other uses of the present invention will be apparent from the teachings disclosed herein. Further, the present invention will be best understood from the following detailed description of exemplary embodiments with reference to the attached drawings, wherein like reference numerals and characters refer to like parts, and by reference to the following Claims.

Figure 1:
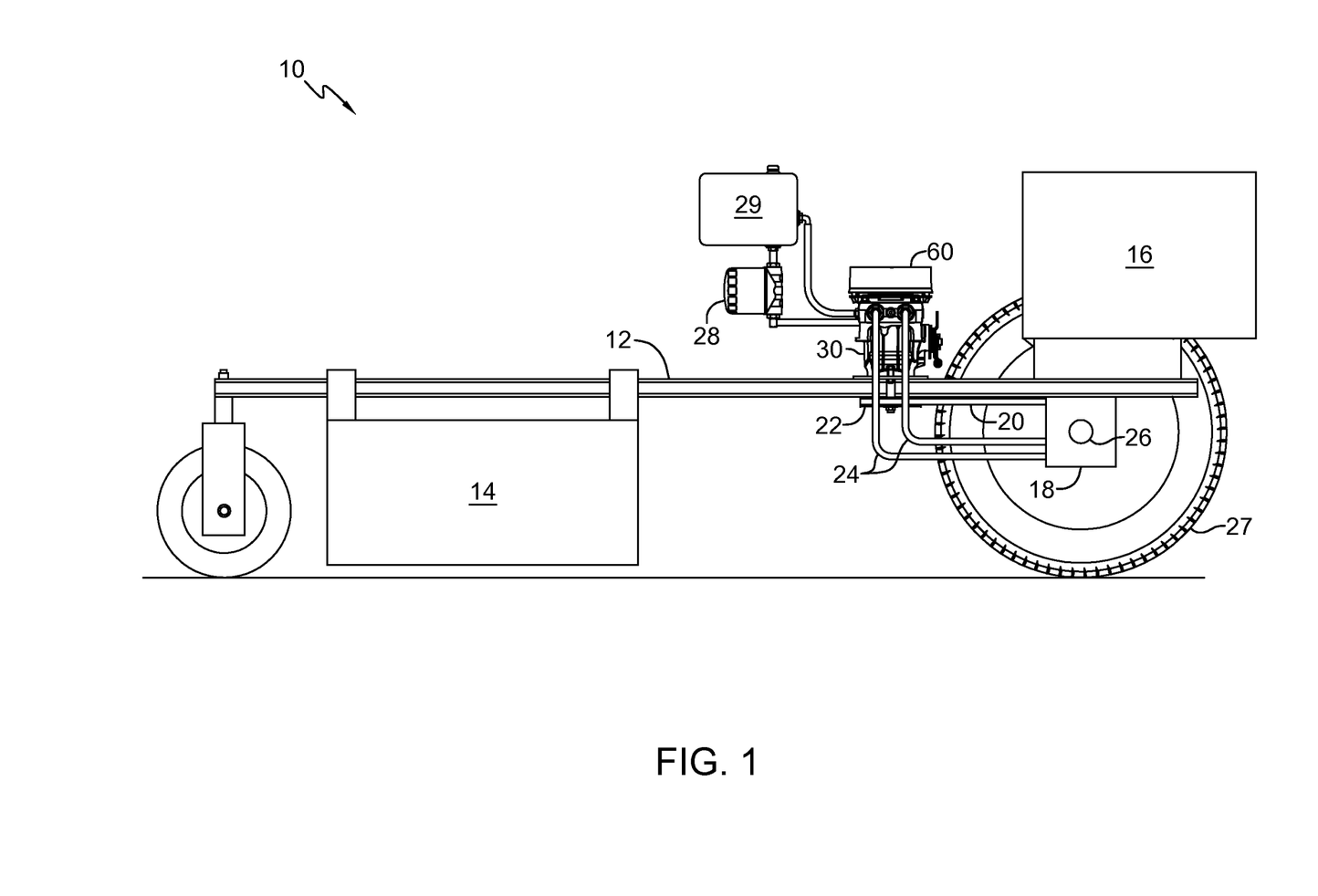
FIG. 1 illustrates a side elevational view of a simplified zero turn mower on which is mounted a hydraulic pump incorporating one embodiment of this invention, where one wheel of the mower has been removed for clarity.
Figure 2:
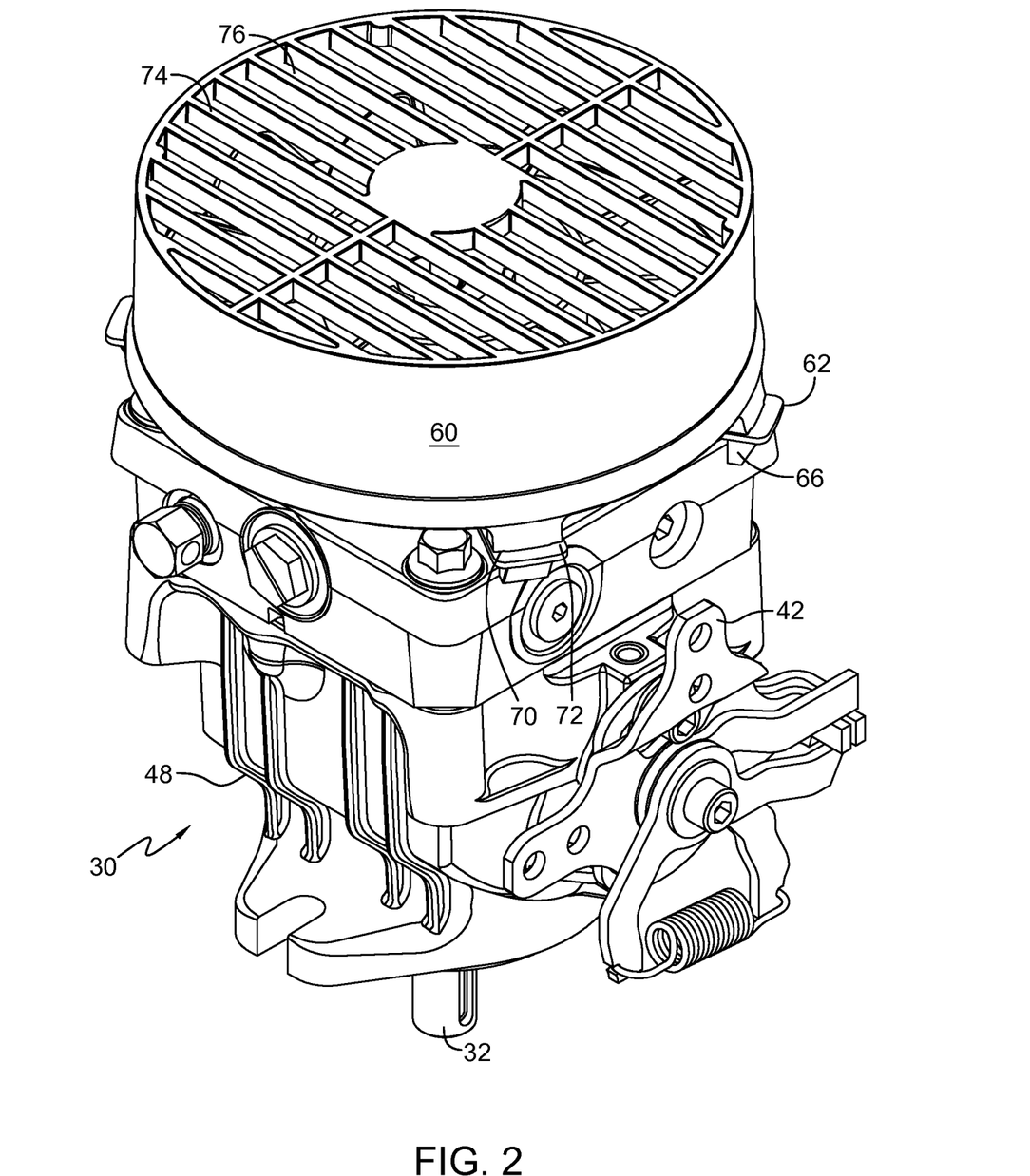
FIG. 2 is a perspective view of the pump shown in FIG. 1.
Figure 3:
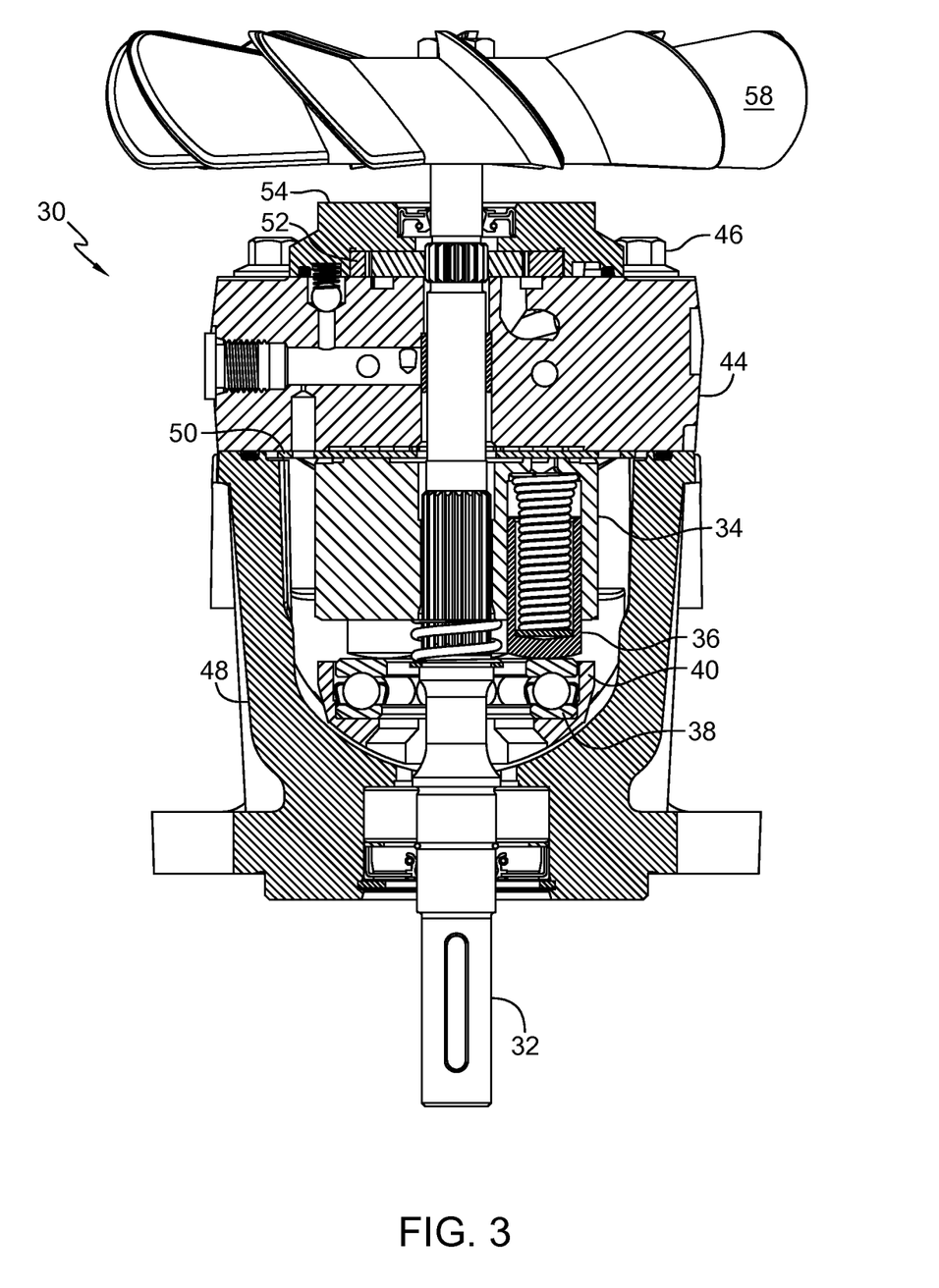
FIG. 3 is a partially-sectioned internal view of the pump shown in FIG. 2, with the fan shroud removed for clarity.

FIG. 1 depicts a zero-turn mowing vehicle 10 on which would usually be mounted a pair of pumps 30, though only one is visible in FIG. 1. As illustrated, pump 30 is mounted to frame 12 of zero-turn mowing vehicle 10. Also mounted on frame 12 of zero-turn mowing vehicle 10 is mowing deck 14, prime mover 16, and wheel motor 18, which drives axle shaft 26 and thus wheel 27. In operation, prime mover 16 drives belt 20, which rotatingly drives pump pulley 22. Pump pulley 22 is mounted on a pump input shaft, which will be described in more detail herein. Also shown in FIG. 1, without mounting brackets, are filter 28 and reservoir 29. Referring to FIGS. 2 and 3, it is illustrated that pump input shaft 32 drives cylinder block 34. Pistons 36 are further illustrated as being mounted within cylinder block 34. Pistons 36 contact thrust bearing 38, which is shown as mounted within swash plate 40. When swash plate 40 is in the position illustrated in FIG. 3, pump 30 is in a neutral position and any fluid flow through hydraulic lines 24 (as illustrated in FIG. 1) is minimal and insufficient to cause wheel motor 18 to drive axle shaft 26. However, when swash plate 40 is moved from the neutral position by the action of control arm 42, pressurized fluid will flow in one of the two hydraulic lines 24, causing wheel motor 18 to drive axle shaft 26 in a direction corresponding to the direction of movement of swash plate 40.

Additionally, cylinder block 34 runs against end cap 44, which is preferably attached to housing 48 by a plurality of fasteners 46. Some pumps may also incorporate a valve plate 50 as a running surface for cylinder block 34.

Figure 4:
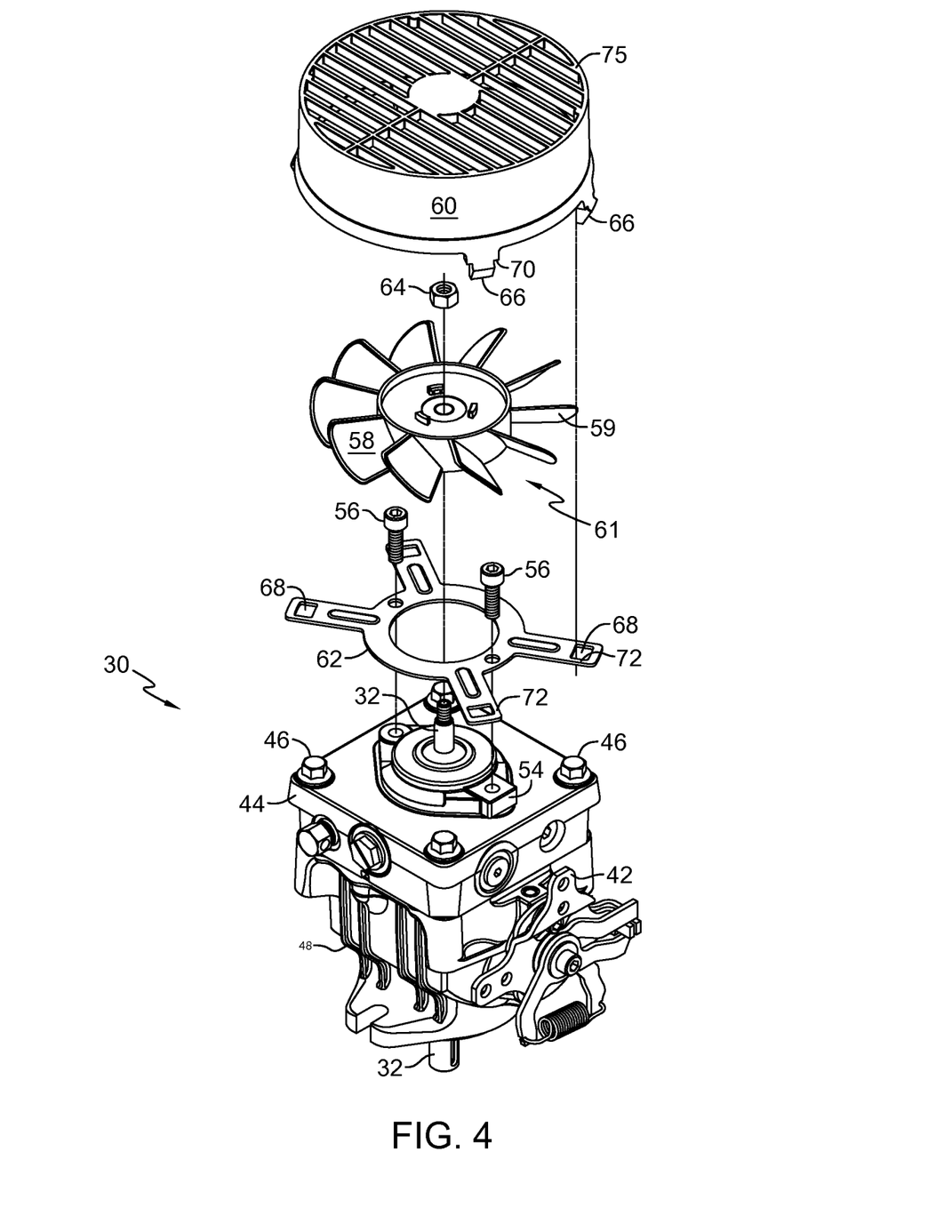
FIG. 4 is an exploded view of the pump shown in FIG. 2.

As illustrated in FIGS. 3 and 4, a charge pump 52 may be externally mounted to end cap 44. Further, charge pump 52 may be disposed within charge pump housing 54, which is attached to end cap 44 by means of charge pump housing fasteners 56. Pump input shaft 32 may extend through end cap 44, and also charge pump 52 and charge pump housing 54, to allow the mounting of fan 58.

Additional elements and details of the operation of hydraulic pumps may be found in U.S. Pat. No. 6,332,393, to Trimble, the disclosure of which is incorporated by reference herein in its entirety.

To aid in guarding fan 58 from debris, as well as unintentional contact, fan shroud 60 is provided, as shown in FIGS. 1-2 and 4-6. Referring to these Figures, it is illustrated that shroud bracket 62 is affixed to charge pump housing 54 with the same charge pump housing fasteners 56 that also attach charge pump housing 54 to end cap 44. After shroud bracket 62 is attached to charge pump housing 54, fan 58 is mounted on the end of pump input shaft 32 and retained by fastener 64.

Figure 5:
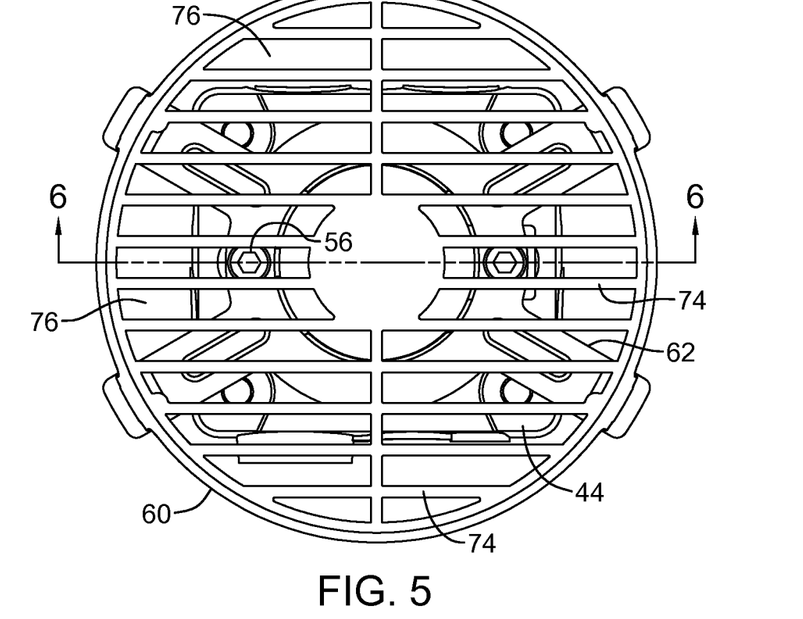
FIG. 5 illustrates a top view of the fan shroud, charge pump housing and end cap of the pump shown in FIG. 2.
Figure 6:
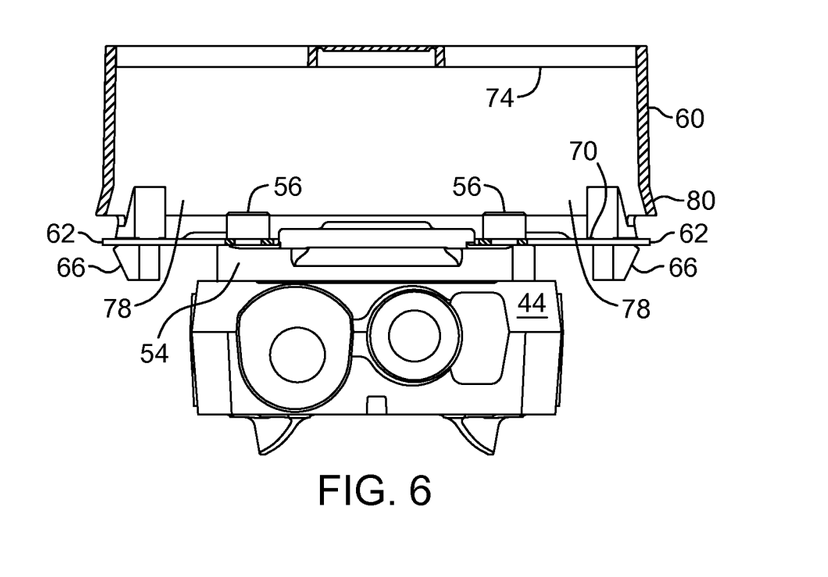
FIG. 6 is a side view of the fan shroud, charge pump housing and end cap shown in FIG. 5, with the fan shroud sectioned along Lines 6-6 in FIG. 5.

Fan shroud 60 is then mounted onto shroud bracket 62. The mounting may preferably be done by means of snaps 66 formed near the base of fan shroud 60. Snaps 66 are inserted into openings 68 formed in shroud bracket 62, where the configuration of snaps 66 then retains fan shroud 60 on shroud bracket 62. Snap stops 70 formed adjacent to snaps 66 on fan shroud 60 will come into contact with opening stops 72 formed adjacent to openings 68 on shroud bracket 62, thus establishing the position of fan shroud 60 during installation. Louvers 74 on the top of fan shroud 60 will limit the entry of debris and other objects while allowing air to flow through openings 76 between louvers 74 of fan shroud 60 and into fan 58.

FIGS. 5 and 6 show additional details of fan shroud 60 and the way fan shroud 60 may be mounted to pump 30. Shroud bracket 62 preferably comprises a material that has dimensional stability to maintain the sealing characteristic of charge pump housing 54 against end cap 44, such as, for example, steel, though other materials may be used, depending on the required clamping force of charge pump housing fasteners 56, the head configuration of charge pump housing fasteners 56 and whether load dispersion is available, such as through a washer under the head of charge pump housing fastener 56.

Air enters fan shroud 60 through openings 76 between louvers 74 by the action of fan 58, which has been removed from FIGS. 5 and 6 for clarity. Air is then forced downward by the action of fan 58 through the open end 78 of fan shroud 60 and then around shroud bracket 62 and then along end cap 44 and housing 48. Shroud bracket 62, as illustrated in the embodiments shown in FIGS. 4, 5 and 6, is formed in an "X" shape to allow air to flow in the open areas between the legs of the "X." Other shapes are anticipated, such as a design that uses three leg extensions, and two leg extensions with a wider area to support a larger snap stop 70 for stability of fan shroud 60.

Fan shroud 60 also includes angled skirt 80 that serves several functions. First, angled skirt 80 moves the lower edge of fan shroud 60 away from fan 58, further minimizing the ability of objects to inadvertently reach fan 58 from the bottom of fan shroud 60. Second, angled skirt 80 also opens the bottom of fan shroud 60 outward, providing additional cross-section and air guidance as air exits fan shroud 60.

Figure 7:
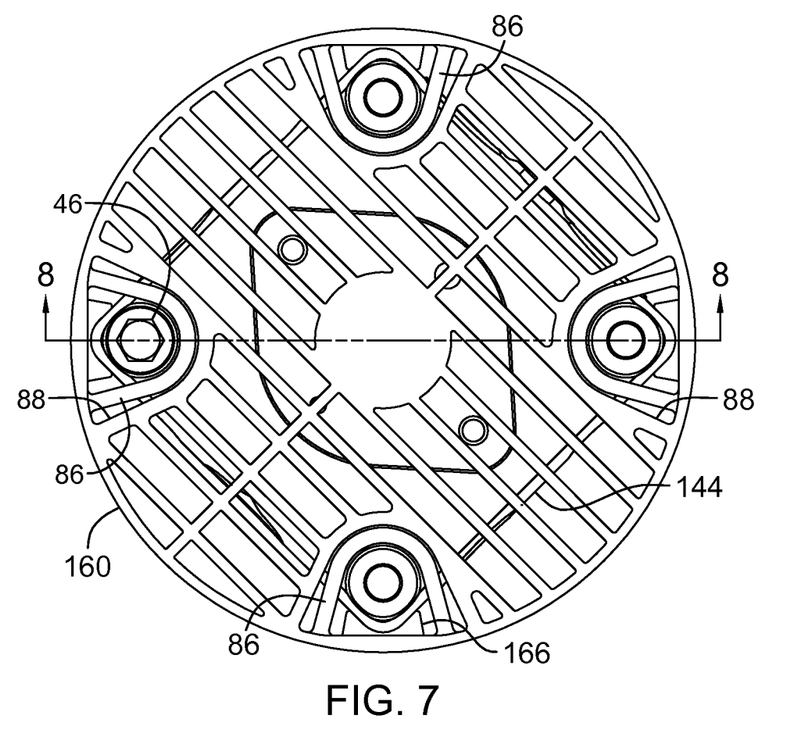
FIG. 7 illustrates a top view of a second embodiment of the fan shroud and end cap.
Figure 8:
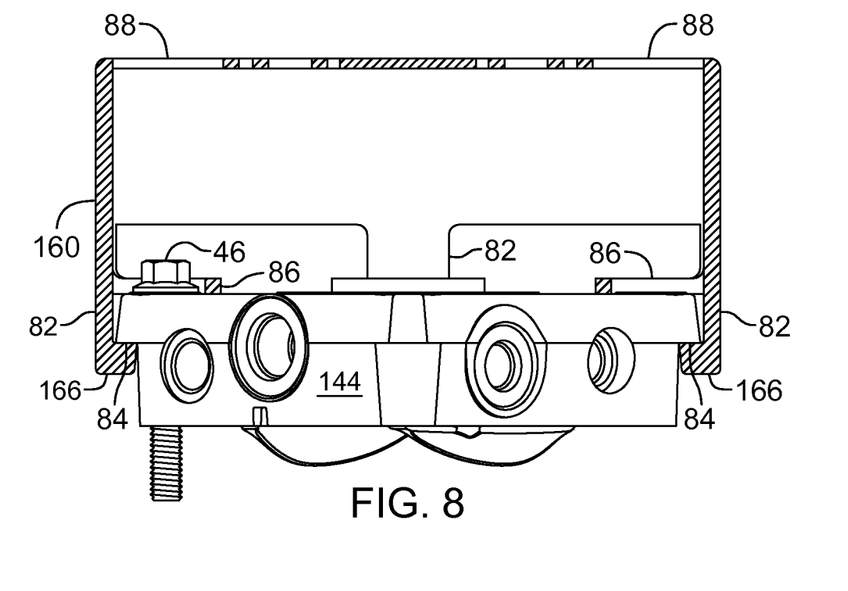
FIG. 8 is a side view of the fan shroud and end cap shown in FIG. 7, with the shroud sectioned along Lines 8-8.

FIGS. 7 and 8 depict a second embodiment of fan shroud 160. Fan shroud 160 eliminates the need for separate shroud bracket 62, as used in the first embodiment described above. In this embodiment fan shroud 160 snaps directly to end cap 144. Snaps 166 are disposed near the end of flexible legs 82. As fan shroud 160 is pushed onto end cap 144, flexible legs 82 bend outward until snaps 166 pass below stops 84, allowing snaps 166 to move inward toward end cap 144 so that snaps 166 interface with stops 84, retaining fan shroud 160 on end cap 144.

This embodiment also includes a feature to prevent fan shroud 160 from being pushed onto end cap 144 to the point where fan shroud 160 might contact fan 58 (fan 58 is not shown in FIGS. 7 and 8). To prevent this situation, ring 86 is formed a distance from snap 166 to provide a limit to how far fan shroud 160 can be pushed onto end cap 144. Ring 86 is formed so that it becomes arranged about fastener 46. This arrangement aids in preventing fan shroud 160 from being rotated, which might disengage snaps 166 from stops 84, which would then allow fan shroud 160 to become disengaged from end cap 144, a situation that is seen as operationally undesirable as it would allow shroud 160 to contact fan 58 (not shown in FIGS. 7 and 8).

Openings 88 are available to allow a die to be positioned to form ring 86 from the top side. There are other die configurations such as side pulls that could also be used to form ring 86. The size of die access openings such as openings 88 should be minimized to the extent possible to reduce the ability for objects to enter shroud 160. As will be shown in a subsequent embodiment, openings 88 may be blocked by a plug to further limit access to the interior of shroud 160. Another consideration for this embodiment is the ability to maneuver rings 86 between fan blades 59, shown in FIG. 4. There are several designs that may be used separately or together. Gap 61 between blades 59, also shown in FIG. 4, may be wide enough to permit rings 86 to pass between blades 59. Fan 58 may be of a flexible material that allows blades 59 to bend away from rings 86 as shroud 160 is pushed onto pump 30. Similarly, shroud 160 may be of a material that provides some flexibility to rings 86, allowing them to bend to pass blades 59. Some fans 58 may be sized so that there is little or no interference between rings 86 and blades 59 during the installation of shroud 160. Yet another option is to form louver portion 75 of shroud 160 as a separate piece so that the fan may be installed and louver portion 75 then attached to the main body of shroud 160.

Figure 9:
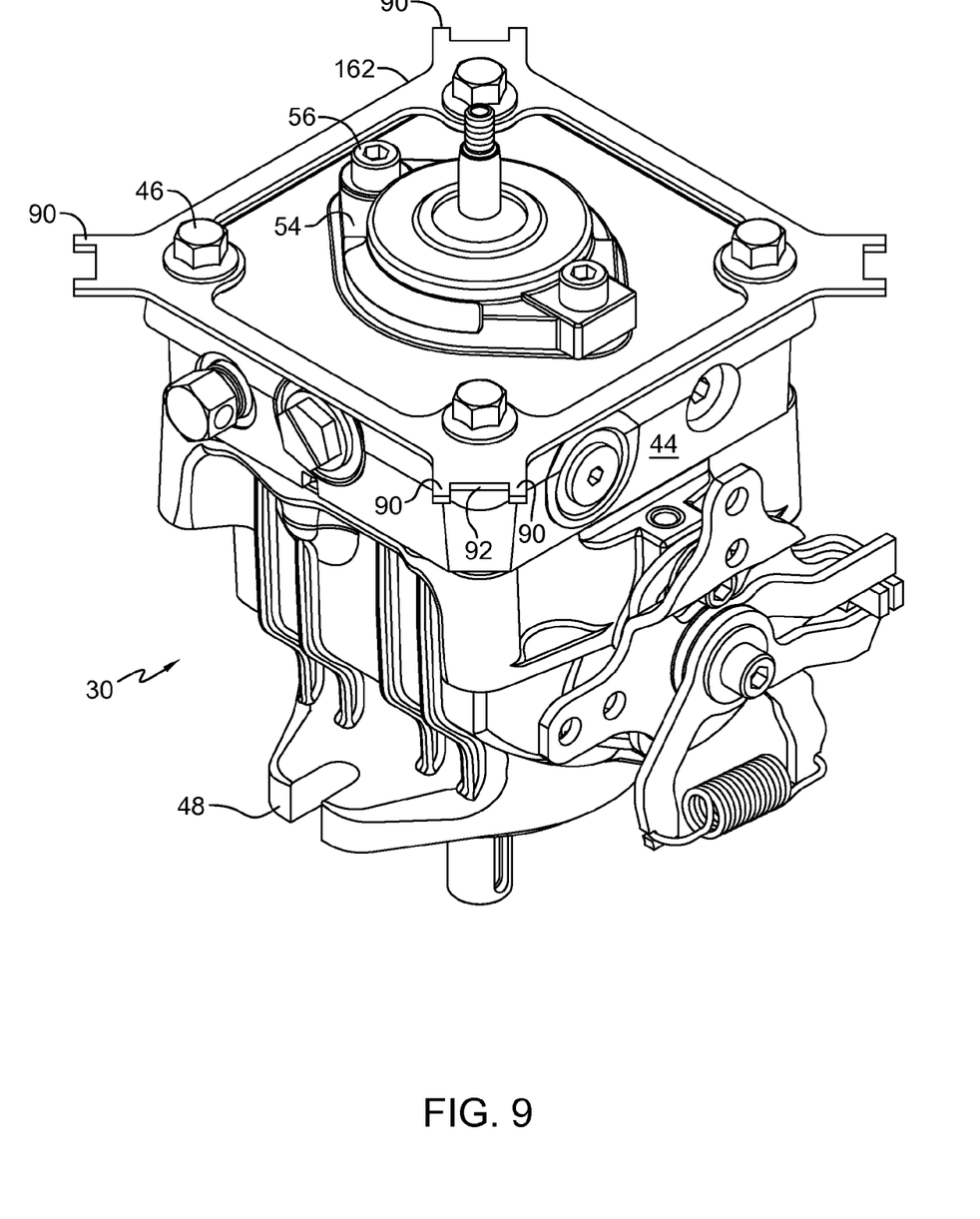
FIG. 9 illustrates a perspective view of a pump similar to that of the pump in FIG. 2, incorporating a bracket compatible with the second embodiment fan shroud with the shroud and fan removed for clarity.

FIG. 9 depicts a second embodiment of shroud bracket 162 that is mounted to end cap 44 using fasteners 46. Bracket 162 is compatible with the snap 166 configuration of FIG. 8. Bracket 162 is supported in more locations than bracket 62, and will thus be more stable for larger shrouds. Thus, bracket 162 allows retention of the benefits of shroud 160 but eliminates the need to form stops 84 into end cap 144. Tabs 90 formed adjacent to stops 92 aid in preventing rotation of an attached shroud, similar to the function of ring 86 in the previously discussed embodiment.

Figure 10:
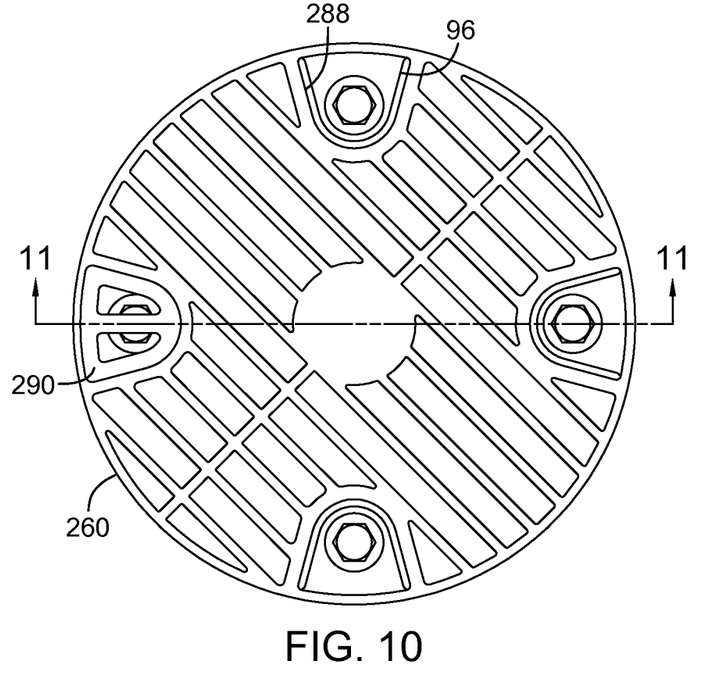
FIG. 10 illustrates a top view of a third embodiment of the fan shroud.
Figure 11:
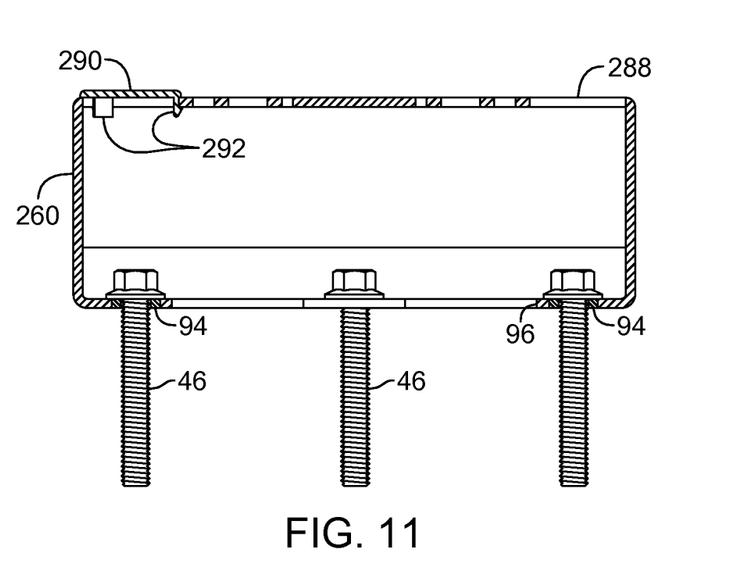
FIG. 11 is a view of the fan shroud depicted in FIG. 10 along Lines 11-11.

FIGS. 10 and 11 depict a third embodiment of fan shroud 260. In this embodiment, fan shroud 260 is attached to end cap 44 (not shown in FIGS. 10 and 11) by fasteners 46. In order to prevent the yielding of fan shroud 260 that might occur if fan shroud 260 was made of a polymer material, inserts 94 are molded into tabs 96. Inserts 94 would likely comprise metal, or other high strength material to maintain the clamping force of fasteners 46. Openings 288 are formed in fan shroud 260 to allow a die to reach into shroud 260 to form tabs 96. As with fan shroud 160, openings 288 should be made as small as possible. Further, each of the openings 288 should be sufficiently large enough to allow for the insertion of a securing device, such as, for example, a screwdriver, ratchet, etc., to affix fasteners 46 to pump 30. As was described in the previous embodiment, there are a variety of techniques to permit installation of tabs 96 past fan blades 59.

As illustrated in FIGS. 10 and 11, fan shroud 260 preferably includes a plurality of plugs 290. Each plug 290 is used to cover one of the plurality of openings 288, thereby limiting the entry of foreign objects into fan shroud 260. Preferably, plugs 290 are fastened into place on fan shroud 260 which the assistance of snaps 292. The operation of snaps 292 is similar to the discussion of the operation of the other snaps disclosed herein.

The various embodiments described herein describe fan shroud 60 as having snaps 66 or the equivalent. This configuration is advantageous because of the ease of forming snap features into an injection molded part versus the components to which shroud 60 is attached. However, it is also anticipated that shroud 60 could be formed with openings while mating components such as bracket 62 could be formed with mating snaps.

While specific embodiments of the invention have been described in detail, it will be appreciated by those skilled in the art that various modifications and alternatives to those details could be developed in light of the overall teachings of the disclosure. Accordingly, the particular arrangements of the shroud, bracket, end cap, pump, etc. disclosed are meant to be illustrative only and not limiting as to the scope of the invention which is to be given the full breadth of the appended claims and any equivalents thereof.

What is claimed is:

1. A vehicle comprising:
a frame;
a mowing deck mounted on the frame;
a prime mover mounted on the frame;
a pump mounted on the frame and driven by the prime mover, the pump having a housing, a first end and a second end opposite the first end;
an end cap secured to one of the first or second ends of the pump and having a sidewall;
a pump shaft extending from the first end and the second end of the pump, the pump shaft having an axis generally parallel to the end cap sidewall;
a fan attached to one end of the pump shaft;
a bracket attached to the pump, the bracket having:
a center portion having a first opening through which the pump shaft extends, the center portion defining a first plane; and
a plurality of bracket members originating from the center portion of the bracket and extending radially outward from the center portion of the bracket along the first plane and beyond the end cap sidewall, each of the bracket members defining a second opening; and
a fan shroud having a fan shroud sidewall and a plurality of legs extending from the fan shroud sidewall, each of the plurality of legs ending in a snap, wherein each of the snaps engages one of the bracket members at a position on the corresponding bracket member located beyond the end cap sidewall, thereby attaching the fan shroud to the bracket.

2. The vehicle of claim 1, wherein the bracket is removably attached to the end cap.

3. The vehicle of claim 1, wherein the pump further comprises a charge pump having a charge pump housing attached to the end cap and wherein the bracket is removably attached to the charge pump housing.

4. The vehicle of claim 1, wherein an input from the prime mover is attached to an end of the pump shaft opposite the one end to which the fan is attached.

5. The vehicle of claim 1, wherein the fan shroud further comprises a plurality of stops and abutting the bracket, wherein each of the plurality of stops corresponds to one of the snaps.

6. The vehicle of claim 1, wherein the fan shroud includes a skirt portion that extends at an angle radially outward from the fan shroud sidewall.

7. The vehicle of claim 6, wherein the fan shroud further comprises a plurality of stops corresponding to the snaps and abutting the bracket.

8. A vehicle comprising:
a frame;
a hydrostatic apparatus mounted to the frame, the hydrostatic apparatus having a pump shaft and an end cap with a sidewall;
a fan mounted on the pump shaft, the fan having a first face generally forming a first plane perpendicular to the pump shaft and a second face generally forming a second plane perpendicular to the pump shaft and parallel to and opposite the first face;
a fan shroud apparatus comprising:
a bracket having a center portion generally proximate to the pump shaft and a plurality of bracket members, the center portion having an opening through which the pump shaft extends, and the bracket members originate from the center portion of the bracket and extend radially outward from the center portion of the bracket beyond the end cap sidewall; and
a fan shroud comprising a fan shroud top, a fan shroud sidewall extending from an edge of the fan shroud top and ending in a base, and at least one snap extending from the base and engaging one of the plurality of bracket members at a position on the one bracket member located beyond the end cap sidewall;
wherein the bracket engages an end of a hydrostatic pump to allow the fan shroud to generally enclose the fan such that the fan shroud top is adjacent the first face of the fan and the bracket lies in a plane generally parallel to and axially adjacent the second face of the fan.

9. The vehicle of claim 8, wherein the fan shroud includes a skirt portion that extends at an angle radially outward from the fan shroud sidewall.

10. A pump comprising:
a housing having a first end and a second end;
an end cap having an end surface and a sidewall, the end cap attached to the first end of the housing by a plurality of fasteners;
a plurality of stops formed on the end cap;
a pump shaft disposed in the housing and extending from the first end and the second end of the housing;
a fan attached to the end of the pump shaft extending from the first end of the housing; and
a fan shroud having a first end forming a first plane generally perpendicular to the pump shaft;
a plurality of legs extending from the first end of the fan shroud generally perpendicular to the first plane, each of the plurality of legs having a snap extending radially inward from the leg and engaging one of the plurality of stops on the end cap; and
a plurality of rings extending radially inward from each of the plurality of legs, the plurality of rings engaging the end surface of the end cap and abutting one of the plurality of fasteners;
whereby the fan shroud generally encloses the fan.

11. The pump of claim 10, wherein each of the plurality of rings surrounds a portion of one of the plurality of fasteners.

12. The pump of claim 10, wherein opposed surfaces of the end cap are retained between one of the plurality of snaps and one of the plurality of rings.

13. The pump of claim 10, further comprising a plurality of openings formed in the first end of the fan shroud and corresponding to the positions of the plurality of fasteners.

14. The pump of claim 13, further comprising a plurality of plugs removably covering the plurality of openings in the first end of the fan shroud.

* * * * *